United States Patent
Söntgen et al.

(10) Patent No.: US 8,104,530 B2
(45) Date of Patent: Jan. 31, 2012

(54) COMPONENT OF A STEELWORKS, SUCH AS A CONTINUOUS CASTING INSTALLATION OR A ROLLING MILL, METHOD FOR PRODUCING SUCH A COMPONENT AND INSTALLATION FOR CREATING OR PROCESSING SEMIFINISHED METALLIC PRODUCTS

(75) Inventors: Thomas Söntgen, Duisburg (DE); Robert Wagner, Eckental (DE)

(73) Assignee: Siemens Aktiengesellschaft, Munich (DE)

( * ) Notice: Subject to any disclaimer, the term of this patent is extended or adjusted under 35 U.S.C. 154(b) by 393 days.

(21) Appl. No.: 12/097,849

(22) PCT Filed: Nov. 7, 2006

(86) PCT No.: PCT/EP2006/068159
§ 371 (c)(1),
(2), (4) Date: Jun. 17, 2008

(87) PCT Pub. No.: WO2007/071493
PCT Pub. Date: Jun. 28, 2007

(65) Prior Publication Data
US 2008/0257521 A1    Oct. 23, 2008

(30) Foreign Application Priority Data
Dec. 19, 2005 (DE) .......................... 10 2005 061 134

(51) Int. Cl.
*B22D 11/00* (2006.01)
*B22D 11/059* (2006.01)
*B22D 11/128* (2006.01)
*B22C 3/00* (2006.01)

(52) U.S. Cl. ....................................................... 164/418
(58) Field of Classification Search .................. 164/138, 164/418, 72, 442, 448
See application file for complete search history.

(56) References Cited

U.S. PATENT DOCUMENTS

| | | | |
|---|---|---|---|
| 4,197,902 A | 4/1980 | Von Jan et al. | 164/418 |
| 7,021,363 B2 | 4/2006 | Gnass et al. | 164/418 |
| 2003/0102104 A1* | 6/2003 | Gnass et al. | 164/418 |

FOREIGN PATENT DOCUMENTS

| | | |
|---|---|---|
| BE | 901055 | 5/1985 |
| CN | 2368857 Y | 3/2000 |
| DE | 2634633 | 7/1976 |
| GB | 2246145 | 1/1992 |
| JP | 61-159247 A * | 7/1986 |
| JP | 63-86856 A * | 4/1988 |
| JP | 64-66049 A * | 3/1989 |
| JP | 6330392 A | 11/1994 |
| JP | 2002282910 | 10/2002 |
| WO | 01/83136 | 11/2001 |
| WO | 2004/072357 | 8/2004 |
| WO | 2005/002742 | 1/2005 |

OTHER PUBLICATIONS

International Search Report; PCT/EP2006/068159; pp. 5, mailed Feb. 26, 2007, Feb. 21, 2007.

* cited by examiner

*Primary Examiner* — Kevin P Kerns
(74) *Attorney, Agent, or Firm* — King & Spalding L.L.P.

(57) ABSTRACT

In order to increase the endurance and lifetime of highly loaded components (6, 8, 12, 14, 24, 26, 34) of a steelworks, an electrolytically applied coating (38) is provided, having a ductile metallic base material (39), in particular nickel or a nickel alloy, with hard material particles (40), in particular boron carbide particles, incorporated in it. This measure achieves high resistance to corrosion, good thermal conductivity and at the same time high mechanical loadability.

23 Claims, 2 Drawing Sheets

US 8,104,530 B2

COMPONENT OF A STEELWORKS, SUCH AS A CONTINUOUS CASTING INSTALLATION OR A ROLLING MILL, METHOD FOR PRODUCING SUCH A COMPONENT AND INSTALLATION FOR CREATING OR PROCESSING SEMIFINISHED METALLIC PRODUCTS

CROSS-REFERENCE TO RELATED APPLICATIONS

This application is a U.S. national stage application of International Application No. PCT/EP2006/068159 filed Nov. 7, 2006, which designates the United States of America, and claims priority to German application number 10 2005 061 134.6 filed Dec. 19, 2005, the contents of which are hereby incorporated by reference in their entirety.

TECHNICAL FIELD

The invention relates to a component of a continuous casting installation, such as, for example, a mold, a segment, as it is known, or a transport roller. The invention relates, furthermore, to a component of a rolling mill such as, for example, rolls, in particular working rolls or else supporting rolls of a rolling mill train. The invention therefore relates, in general, to a component of a steelworks and to a method for producing the component. The invention relates, furthermore, to an installation, in particular a continuous casting installation, for creating semifinished metallic products from a melt or else to an installation for processing semifinished metallic products of this type, in particular a rolling mill.

BACKGROUND

The term "steelworks" therefore designates in general, here, both the installation for creating the semifinished product from a melt and the installation for processing the semifinished product. The term "steelworks" is in this context not to be interpreted as restricted to steel-processing installations in which only steel is generated and processed. On the contrary, this is also understood as meaning installations in which other metals are processed.

In a continuous casting installation, a metal melt is poured continuously via a ladle into and through a mold, as it is known, for example a plate mold or a tubular mold. Downstream of the mold, the molten metal strand is guided with the aid of segments, as they are known, and simultaneously cooled, until the metal strand has solidified. By separation, for example, slabs, cogged ingots or billets, as they are known, are obtained. Sheets are generated from the slabs, for example by rolling out first in a hot-rolling mill train and then by cold-rolling.

Hot-rolling may in this case take place directly after continuous casting or at a later time point and at another location.

In a steelworks of this type, the components which come into contact with the metal to be processed, for example the viscous melt or even the solidified melt, are exposed to a very high stress. On account of very high temperatures, this is a very high thermal alternating stress. At the same time, these components are also exposed to considerable mechanical stress. In particular, the rolls in a rolling mill have to apply considerable mechanical forces. Moreover, in the treatment of the melt in a continuous casting installation, the components are exposed to a highly corrosive environment, since corrosive fluxes are used for the melt and, at the same time, water is employed in order to cool the melt.

On account of these considerable loads, these components have only a limited useful life and have to be exchanged regularly.

SUMMARY

The service life and therefore the lifetime of components of this type can be increased to make it possible to operate a steelworks more cost-effectively overall.

According to an embodiment, a component of a steelworks or a segment of a continuous casting installation or a roll of a rolling mill, may comprise a basic body to which a coating is applied, the coating comprising a ductile metallic basic material with hard material particles embedded in it, wherein the basic material is nickel or a nickel alloy and the nickel fraction of the coating is between about 65% by volume and 95% by volume and the fraction of hard material particles in the coating is in the range of between 5% by volume and 30% by volume.

According to a further embodiment, the hard material particles may project above a surface defined by the basic material. According to a further embodiment, the nickel fraction may be in the region of about 75% by volume. According to a further embodiment, the alloying constituents provided may be tungsten and/or iron and/or cobalt. According to a further embodiment, the fraction of the alloying constituents in the coating can be between about 10% by volume and 20% by volume. According to a further embodiment, the hard material particles may have a size in the nanometer range or in the micrometer range. According to a further embodiment, the hard material particles used can be boron carbide particles, tungsten carbide particles and/or diamond particles. According to a further embodiment, the thickness of the coating may be in the range of between about 0.7 mm and about 6 mm or in the range of between about 2 mm and 3 mm. According to a further embodiment, the coating can be applied electrolytically. According to a further embodiment, a hard coating or a diamond coating, can be applied to the coating. According to a further embodiment, the hard coating has a thickness of up to about 0.5 mm. According to a further embodiment, the coating may have a thickness in the range of 0.1 mm to about 3 mm. According to a further embodiment, According to a further embodiment, the hard coating can be applied by means of a CVD method. According to a further embodiment, the segment may have a plurality of transport rollers and the size of the hard material particles for the transport roller may be in the micrometer range. According to a further embodiment, the transport rollers may have a higher fraction of hard material particles, as compared with the remaining segment. According to a further embodiment, the size of the hard material particles for the roll can be in the nanometer range. According to a further embodiment, the fraction of hard material particles can be in the range of between 15% by volume and 25% by volume. According to a further embodiment, the roll can be provided with a hard material coating.

According to another embodiment, a method for producing a component may comprise the step of applying a coating electrolytically to a basic body, wherein the coating comprising a ductile metallic basic material with hard material particles embedded in it, wherein the basic material is nickel or a nickel alloy and the nickel fraction of the coating is between about 65% by volume and 95% by volume and the fraction of hard material particles in the coating is in the range of between 5% by volume and 30% by volume.

According to yet another further embodiment, an installation for generating semifinished metallic products from a melt, or a continuous casting installation, or an installation for processing semifinished metallic products, may comprise a component as described above.

BRIEF DESCRIPTION OF THE DRAWINGS

An exemplary embodiment of the invention is explained in more detail below with reference to the drawing in which, in each case in diagrammatic and highly simplified illustrations.

Identically acting parts are given the same reference symbols in the individual figures.

DETAILED DESCRIPTION

Figure 1:
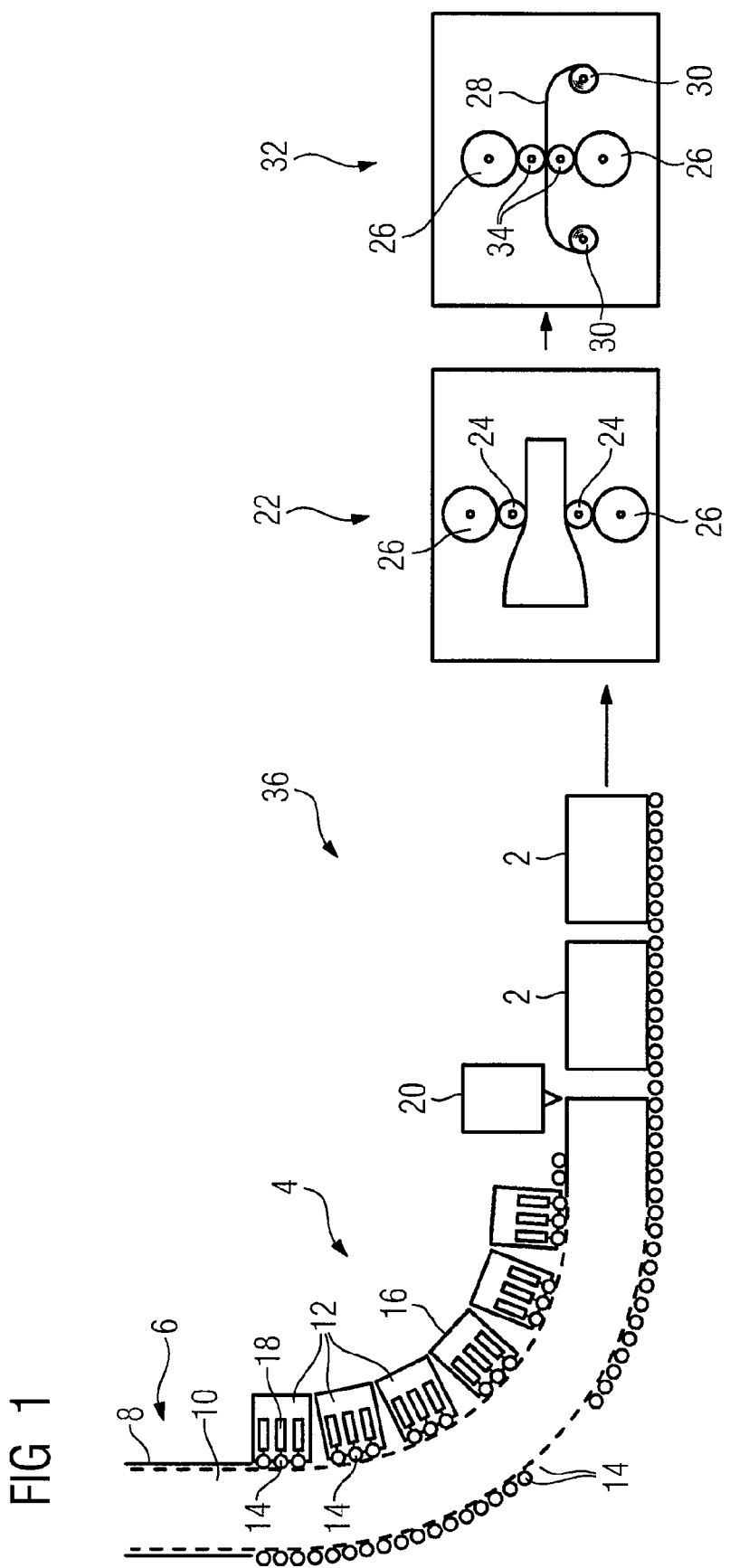
FIG. 1 shows an illustration of a steelworks with a continuous casting installation having a following hot-rolling installation and cold-rolling installation.

According to various embodiments, there is provision for the component to have a basic body, onto which a coating consisting of a ductile metallic basic material is applied as a matrix with hard material particles embedded in it.

Ductile metallic basic material is understood in this context to mean a comparatively soft metallic basic material which has a Vickers hardness of max. about 180-230 $HV_{ol}$. The determination of hardness according to Vickers may be gathered from the standard DIN EN ISO 6507. By contrast, the embedded hard material particles have a markedly higher hardness, for example a hardness higher than that of the basic material by more than the factor 2.

By a ductile material being combined with hard material particles embedded in it, the components are provided with a coating which withstands the extreme loads. On account of the ductility, there is, as compared with a continuous hard and brittle coating, a markedly lower risk that, during operation, the coating is damaged and cracks or microcracks occur, which would quickly lead to undesirable high corrosion because of the highly corrosive environment. Also, the risk of a chipping off of fragments of the coating under mechanical load is markedly lower, because of the high ductility, than in the case of a brittle coating. At the same time, owing to the embedded high material particles, a very high abrasion resistance and therefore virtually a very high surface hardness are obtained, so that a long lifetime is achieved even under high mechanical loads and high abrasive forces.

Expediently, the basic material uses nickel or a nickel alloy. The particular advantage of the nickel coating for components of this type is to be seen in the very high leaktightness of the nickel coating, with the result that the component is protected from corrosion highly effectively. At the same time, nickel has a good thermal conductivity, so that a good controlled heat flow becomes possible via this coating.

Expediently, in this case, the coating is designed in such a way that the nickel matrix defines a surface above which the hard material particles project at least in the microscopic range. By virtue of this configuration, actual mechanical contact occurs via the hard and abrasion-resistant hard material particles, not via the comparatively soft nickel matrix coating.

When a nickel alloy is used for the basic material or the basic matrix, the nickel fraction is preferably in the range of between 65 and 95% by volume and, in particular, is in the region of about 75% by volume, in each case with respect to the overall volume of the coating. Alloying constituents provided are preferably tungsten and/or iron and/or cobalt. Cobalt is particularly preferably used in this case. A coating consisting of nickel, tungsten and iron as constituents has also proved suitable.

Expediently, in this case, the fraction of the alloying constituents is in a range of between about 10 and 20% by volume. Furthermore, the fraction of hard material particles is preferably in a range between 5 and 30% by volume.

Furthermore, there is provision for the hard material particles preferably to have a size in the nanoscale range, for example in the range of between 50 and 1000 nm, or alternatively also in the µm range, for example in the range of 1 and 500 µm. The optional use of nano hard material particles or of micro hard material particles depends on the respective application and the intended use or on the mechanical requirements.

The hard material particles used in this case are preferably boron carbide particles, tungsten carbide particles or diamond particles. Hence, in particular, even ceramic particles, such as boron carbide particles, which are distinguished by their extremely high hardness, are used.

The thickness of the coating is particularly in the range of between about 0.7 and about 6 mm and, in particular, is in the range of between about 2 and 3 mm. It was shown that the coating having such a layer thickness satisfies the stringent requirements particularly well.

In order to produce an effectively and permanently adhering coating of high quality, the coating is expediently applied electrolytically. To form the coating, therefore, the component to be coated is dipped into one or more electroplating baths. The electrode used is an electrode consisting of the basic material, for example a nickel or a nickel alloy electrode. The hard materials are in this case added to the electroplating bath, so that they travel together with the metal ions of the nickel electrode to the component to be coated and are deposited there jointly with the nickel ions forming the matrix.

For components exposed to extremely high mechanical load, in an expedient development, the application of a hard coating on the ductile coating is provided. That is to say, a continuous further layer with a material of very high hardness, in particular with a hardness of, for example, above 1000 HV, is applied to the nickel base layer having the hard material particles embedded in it. In particular, a diamond coating is applied. Such a diamond coating, particularly in combination with the nickel coating or nickel alloy coating lying beneath it, has extremely high leaktightness, very good thermal conductivity, extremely high hardness and very low abrasion. By virtue of such a coating, the service lives of, for example, working rolls in a hot-rolling installation can be increased by markedly more than ten times, as compared with a component coated with hard chrome.

The diamond coating in this case has a thickness of up to about 0.5 mm. When the diamond coating is applied, the thickness of the ductile coating is only in the range of about 0.1 mm to about 3 mm. Since, in this case, the mechanical properties are ensured mainly by the diamond layer, the thickness of the ductile coating having the hard material particles is preferably lower, as compared with a coating without the diamond coating.

Since the coating, also to be designated as a basic coating, with the nickel or nickel alloy matrix serves in this case in a manner of an adhesion promoter layer, so that the diamond coating can be applied reliably and permanently to the material of the basic body, for example steel or copper.

The diamond coating is in this case applied preferably by means of a CVD method (chemical vapor deposition), in order to ensure a reliable and permanent bond with the coating lying beneath it.

The special type and configuration of the coating or, selectively, of the coating system with the diamond coating depend on the respective application.

As a component to be coated, on the one hand, preferably what is known as a segment of a continuous casting installation is provided. In the case of a continuous casting installation, a mold is followed by a multiplicity of segments of this type which serve for guiding the melt strand. The segments are in this case comparatively complex components which have a carrying framework on which a multiplicity of transport or guide rollers for the melt strand are arranged. Conventionally, in this case, the transport rollers can be set in their position by hydraulic cylinders. The mechanical components of the segments, although being exposed to lower mechanical loads, are, instead, exposed to very high thermal and very high corrosive loads. The transport rollers to be assigned to the segments are additionally exposed to a higher mechanical load, even when the load is markedly lower, as compared with the mechanical load on working rolls of a hot-rolling or cold-rolling mill train.

In view of these requirements, therefore, the hard material particles used are in the microcrystalline range, and, furthermore, their fraction amounts only to about 50% by volume in the case of a transport roller or a segment.

In view of the higher load on the transport rollers, as compared with the remaining segment, the transport rollers expediently have a higher fraction of hard material particles. Since the transport rollers are conventionally fastened to the segment, they can easily be provided beforehand with the desired coating in a separate coating operation.

Since the load varies as a function of the distance from the mold, furthermore, there is expediently provision for the near-mold segments and/or transport rollers to have a coating other than that of the mold-distant segments and/or transport rollers. In particular, the fraction of hard material particles increases towards the mold-distant segments on account of the increasing mechanical stress.

A further preferred component which is provided with the coating is a roll, in particular a working roll of a hot-rolling or cold-rolling installation. In addition, however, preferably, further rolls of a rolling installation, for example supporting rolls, are also provided with a coating of this type which, if appropriate, is adapted specially to the requirements. Since the aim with the rolls is to have a defined and, in particular, smooth surface of the rolled semifinished product, for example sheet metal, the size of the hard material particles for the roll is preferably in the nanometer range. On account of the high mechanical load, the fraction of hard material particles is in this case expediently between 15 and 25% by volume.

By contrast, hard material particles in the micrometer range are preferably used for the supporting rolls, since the supporting rolls do not come into contact with the semifinished product to be processed, and they therefore have no effect on the surface quality of the finished workpiece. If the special type of application so requires, nanoscale hard material particles are also used for the supporting rolls.

In view of the high mechanical load, according to a preferred development, the roll is in this case provided with a diamond coating.

The advantages and preferred embodiments listed with regard to the component may also be transferred accordingly to the method and the installation.

A semifinished metallic product, such as, for example, a slab 2, is generated with the aid of a continuous casting installation 4 in a continuous method. In this case, the viscous melt is poured with the aid of a ladle, not illustrated in any more detail, into a mold 6 which is composed, for example, of a plurality of mold plates 8. After flowing through the mold 6, the melt strand 10, illustrated here by dashes, is deflected and guided with the aid of what are known as segments 12. The segments 12 in each case have a plurality of transport rollers 14. The drawing illustrates only a few of the segments 12 and, moreover, in greatly simplified form. The segments 12 are complex components and have a carrying framework 16 to which the transport rollers 14 are connected. The transport rollers 14 are in this case pressed into a defined position against the melt strand 10, in particular, with the aid of cylinders 18. In the region of the segments 12, the melt strand 10 is cooled intensively, so that it gradually solidifies. The solidified melt strand 10 is subsequently subdivided into what are known as slabs 2 with the aid of a cutting device 20.

These are subsequently delivered for further processing to a hot-rolling mill train 22, in which the slabs 2 having a thickness of, for example 25 cm are rolled to a thickness of a few millimeters under high temperatures which, depending on the material, are, for example, up to approximately 1000° C. For this purpose, the slabs 2 are shaped between two working rolls 24. The working rolls 24 are in this case pressed against the surface of the slab 2 by means of supporting rolls 26.

After the hot-rolling mill train 22, the metal sheet 28 thus obtained, which is rolled onto a roll 30, is rolled to the final thickness in the usual way in a cold-rolling mill train 32. Here, too, the metal sheet 28 is pressed between working rolls, designated in this case as cold rolls 34. The cold rolls 34 are supported, in turn, with the aid of supporting rolls 26. Whereas, during hot rolling, which takes place, in particular, immediately after the continuous casting and solidification, the slabs still have a temperature of up to 1000° C., cold rolling takes place at about room temperature.

The continuous casting installation 4, the hot-rolling mill train 22 and the cold-rolling mill train 32 are arranged, for example, jointly in one steelworks 36. However, these three installation parts may likewise be arranged at different locations in different steelworks 36, and in this case an installation which has only a continuous casting installation 4 or only a rolling mill train 22, 32 is likewise designated as a steelworks.

The components subjected to high load during the production first of the slab 2 and later of the metal sheet 28 are, in particular, the mold 6, the segments 12 with the transport rollers 14 and the rolls 24, 34, 26 of the rolling mill trains 22, 32. In this case, depending on the process step or process stage, these components are subjected to different loads. Thus, for example, at the commencement of the process described, in the region of the mold 6, there is a very high thermal and corrosive load on the components. In this region, the metal melt still has a very high temperature, and the components are exposed to the fluxes used. Moreover, in the region of the segments 12, intensive cooling, in particular, by means of water takes place, so that, here, the segments 12 and transport rollers 14 are exposed to a considerable corrosive load. At the same time, however, the metal strand also has to be guided mechanically with the aid of the segments 12, so that, in addition to the high thermal and corrosive load, mechanical load also occurs.

In the region of the hot-rolling mill train 22, the corrosive load caused by the fluxes falls back somewhat and the thermal load also decreases appreciably. At the same time, here, in particular, the working rolls 24 are exposed to considerable mechanical loads. Finally, the thermal load in the cold-rolling milling train 32 is comparatively low, but considerable mechanical loads occur.

Figure 2:
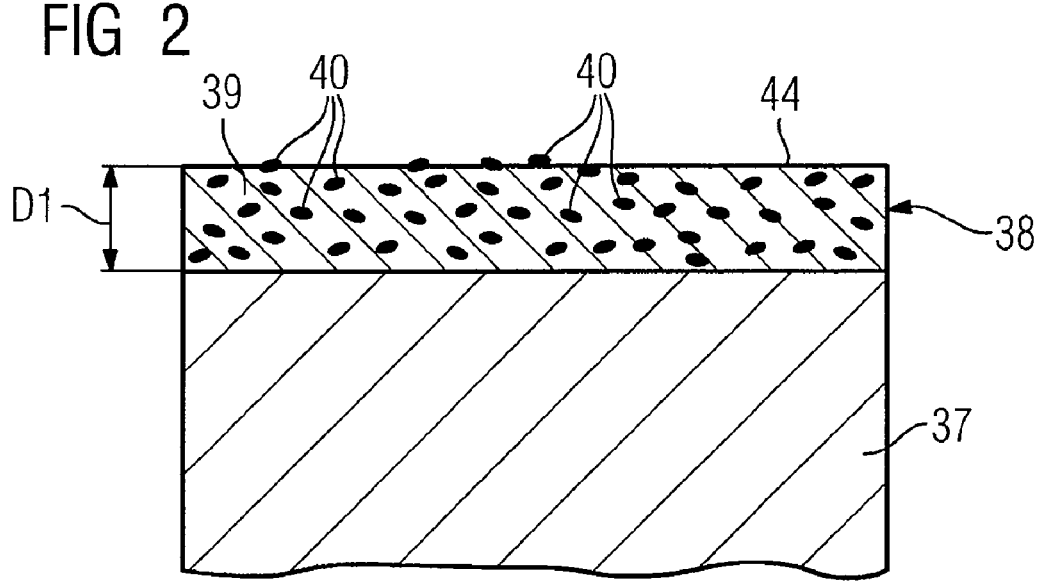
FIG. 2 shows a simplified sectional image through a component which is provided solely with the basic coating.

For all these highly loaded components, a coating or a coating system is in this case provided, which is adapted to the special requirements and, for each of these components, sometimes considerably improves their service life and useful life, as compared, for example, with components coated with hard chrome. The set-up and composition of the coating or of the coating system are explained below with reference to FIGS. 2 and 3.

In each case a coating, designated below as a basic coating 38, on a nickel base is applied electrolytically to a basic body 37 of the components. The basic body consists of copper in the case of the mold 6 and of the mold plate 8. The segments 12, transport rollers 14 and rolls 24, 26, 34 consist, for example, of steel.

The basic coating 38 comprises, in addition to the nickel matrix designated as the basic material 39, a fraction of hard material particles 40, in particular boron carbide particles. By nickel being used as a matrix material, in combination, in particular with boron carbide for the hard material particles 40, a highly gastight and therefore corrosion-resistant and also thermally highly conductive coating, at the same time with a very high surface hardness and low abrasion, is generated.

The high gastightness is achieved by the nickel matrix even in the case of a very low layer thickness of about 10 μm. As compared with a microcrack hard chrome coating, therefore, improved corrosion resistance is afforded. On account of the good thermal conductivity of the nickel basic material 39, the coating has, overall, also a high thermal conductivity, so that a rapid discharge of heat is ensured.

The mechanical loadability of the coating is achieved, in particular, by means of the embedded hard material particles 40 which partially also project above the surface 44 formed by the nickel matrix 39, so that only the hard material particles 40 come into contact with the metal melt 10 or the slab 2 or the metal sheet 28.

Figure 3:
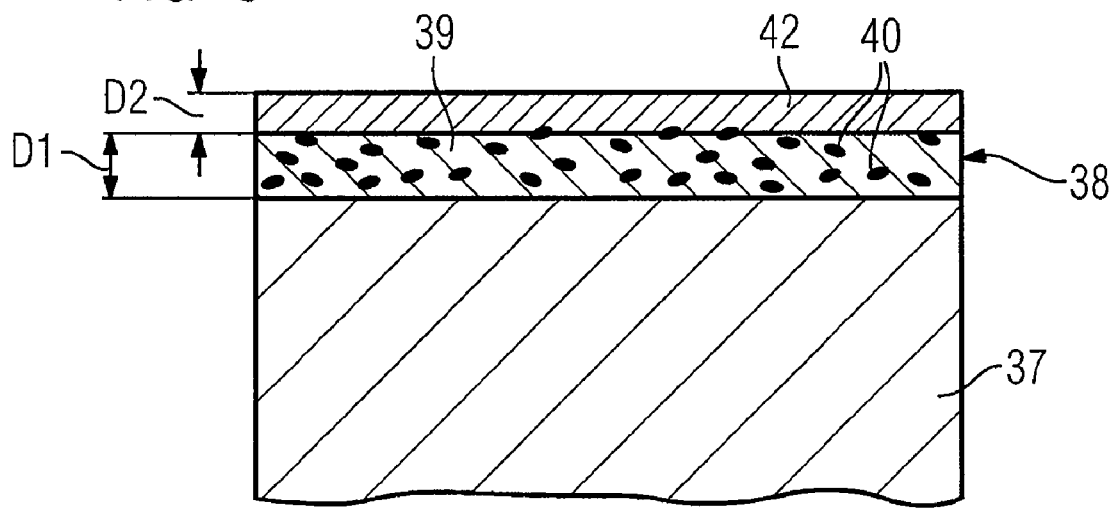
FIG. 3 shows a simplified sectional image through a component which is provided with a layer system consisting of a basic coating and of a diamond coating.

With regard to the components exposed to considerable mechanical load, in particular the working rolls 24 and the cold rolls 34, in preferred embodiments there is additionally provision for the application of a diamond layer 42 on the basic coating 38, as illustrated in FIG. 3.

If the component is a mold 6 or a mold plate 8, the basic body 37 of which usually consists of copper or a copper alloy, only the basic coating 38 is applied. The basic material 39 provided is a nickel/cobalt alloy or else a nickel/iron/tungsten alloy, and in this instance in each case the nickel fraction lies, in particular, in the region of about 75% by volume. The fraction of cobalt or iron and tungsten is between about 10 and 20% by volume. The remaining fraction is formed by the boron carbide particles 40, the size of which lies in the micrometer range. The thickness D1 of the basic coating is in this case in the range of between 2 and 3 mm.

The same coating is provided in the case of the segments 12 and likewise in the case of the transport rollers 14 of the segments 12. Since these are in direct mechanical contact with the melt strand 10, they have, to improve mechanical abrasion, a higher fraction of hard material particles 40, as compared with the remaining segment 12.

Particularly where the working rolls 24, 34 are provided only with the basic coating 38, nano hard material particles 40 are used in order to achieve a high surface quality. The fraction of hard material particles 40 for rolls 24, 34 of this type is also in the upper range of between 15 and 25% by volume. A coating based on a nickel/cobalt alloy in this case has, for example, a composition of about 63% by volume nickel, 12% by volume cobalt and 25% by volume boron carbide particles 40.

By contrast, the supporting rolls 26 have hard material particles 40 in the micrometer range.

With the use of a layer system, as illustrated in FIG. 3, the service life is further increased considerably. In this case, the thickness D1 of the basic coating 38 is in the lower range of between 0.5 and 2 mm. At the same time, the thickness D2 of the diamond coating amounts to about 0.5 mm.

By means of the basic coating 38 described here, the service life of the components is in each case increased by about 4 to 6 times, as compared with a hard chrome coating. When the diamond coating 42 is used, the improvement in the service life is many times above this. Overall, by virtue of the coating measures described here, the useful life of the individual components in a steelworks 36 is prolonged considerably, so that markedly lower costs are incurred in the operation of the steelworks 36.

The invention claimed is:

1. A component of a steelworks, comprising:
   a roll in a rolling mill or a transport roller of the steelworks, including:
   a basic roller body; and
   a coating applied to the basic roller body, the coating comprising a ductile metallic basic material with hard material particles embedded within the ductile metallic basic material, wherein the basic material is nickel or a nickel alloy and the nickel fraction of the coating is between about 65% by volume and 95% by volume and the fraction of hard material particles embedded within the nickel or nickel-alloy basic material of the ductile coating is in the range of between 5% by volume and 30% by volume,
   wherein the thickness of the coating is in the range of between about 2 mm and about 6 mm.

2. The component according to claim 1, wherein the nickel fraction is in the region of about 75% by volume.

3. The component according to claim 1, wherein the basic material of the coating is a nickel alloy and wherein alloying constituents in the nickel alloy include tungsten and/or iron and/or cobalt.

4. The component according to claim 1, wherein the basic material of the coating is a nickel alloy and wherein the fraction of alloying constituents in the coating is between about 10% by volume and 20% by volume.

5. The component according to claim 1, wherein the hard material particles have a size in the nanometer range or in the micrometer range.

6. The component according to claim 1, wherein the hard material particles used are boron carbide particles, tungsten carbide particles and/or diamond particles.

7. The component according to claim 1, wherein the thickness of the coating is in the range of between about 2 mm and 3 mm.

8. The component according to claim 1, wherein the coating is applied electrolytically.

9. The component according to claim 1, wherein a hard coating or a diamond coating is applied to the coating.

10. The component according to claim 9, wherein the hard coating has a thickness of up to about 0.5 mm.

11. The component according to claim 9, wherein the coating has a thickness in the range of 0.1 mm to about 3 mm.

12. The component according to claim 9, wherein the hard coating is applied by means of a CVD method.

13. The component according to claim 1, wherein the component comprises a segment of a continuous casting installation having a plurality of transport rollers and the size of the hard material particles for the transport rollers is in the micrometer range.

14. The component according to claim 13, wherein the transport rollers have a higher fraction of hard material particles, as compared with another portion of the segment.

15. The component according to claim 1, wherein the component comprises a roll of a rolling mill and the size of the hard material particles for the roll is in the nanometer range.

16. The component according to claim 15, wherein the fraction of hard material particles is in the range of between 15% by volume and 25% by volume.

17. The component according to claim 15, wherein the roll is provided with a hard coating.

18. The component according to claim 1, wherein the size of the hard material particles is substantially greater than 5 micrometers.

19. A method for producing a component comprising the step of:
applying a coating electrolytically to a basic roller body of a roll in a rolling mill or a transport roller of the steelworks, the coating comprising a ductile metallic basic material with hard material particles embedded in it, wherein the basic material is nickel or a nickel alloy and the nickel fraction of the coating is between about 65% by volume and 95% by volume and the fraction of hard material particles in the coating is in the range of between 5% by volume and 30% by volume,
wherein the thickness of the coating is in the range of between about 2 mm and about 6 mm.

20. A steelworks apparatus, comprising:
one or more transport rollers that contact a working piece undergoing production; and
one or more support rollers that press the one or more transport rollers against the working piece, but do not contact the working piece undergoing production;
wherein each transport and support roller includes:
a basic roller body; and
a coating applied to the basic roller body, the coating comprising a ductile metallic basic material with hard material particles embedded within the ductile metallic basic material, wherein the basic material is nickel or a nickel alloy and the nickel fraction of the coating is between about 65% by volume and 95% by volume and the fraction of hard material particles embedded within the nickel or nickel-alloy basic material of the ductile coating is in the range of between 5% by volume and 30% by volume; and
wherein the size of the hard material particles in the coating of each transport roller is generally smaller than the size of the hard material particles in the coating of each support roller.

21. The apparatus according to claim 20, wherein:
the size of the hard material particles in the coating of each transport roller is generally in the nanometer range; and
the size of the hard material particles in the coating of each support roller is generally in the micrometer range.

22. A steelworks apparatus, comprising:
a plurality of transport rollers arranged in a row extending away from a metal mold, the transport rollers configured to transport a working piece from the metal mold;
wherein each transport roller includes:
a basic roller body; and
a coating applied to the basic roller body, the coating comprising a ductile metallic basic material with hard material particles embedded within the ductile metallic basic material, wherein the basic material is nickel or a nickel alloy and the nickel fraction of the coating is between about 65% by volume and 95% by volume and the fraction of hard material particles embedded within the nickel or nickel-alloy basic material of the ductile coating is in the range of between 5% by volume and 30% by volume;
wherein the fraction of hard material particles in the coating of individual transport rollers depends on positioning of that transport roller relative to the metal mold, such that transport rollers that experience higher mechanical stresses from the working piece have a greater fraction of hard material particles than transport rollers that experience lower mechanical stresses from the working piece.

23. A component of a steelworks, comprising:
a basic body; and
a ductile coating applied to the basic body, the ductile coating comprising a ductile metallic basic material with hard material particles embedded within the ductile metallic basic material, wherein the basic material is nickel or a nickel alloy and the nickel fraction of the ductile coating is between about 65% by volume and 95% by volume and the fraction of hard material particles embedded within the nickel or nickel-alloy basic material of the ductile coating is in the range of between 5% by volume and 30% by volume, and a continuous hard-material coating applied to the ductile coating.

* * * * *